US011234168B2

(12) United States Patent
Tanaka et al.

(10) Patent No.: US 11,234,168 B2
(45) Date of Patent: Jan. 25, 2022

(54) COMMUNICATION DEVICE AND RADIO COMMUNICATION SYSTEM

(71) Applicant: Panasonic Intellectual Property Management Co., Ltd., Osaka (JP)

(72) Inventors: Osamu Tanaka, Kanagawa (JP); Nobuhiko Arashin, Osaka (JP); Shinichiro Nishioka, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/013,009

(22) Filed: Sep. 4, 2020

(65) Prior Publication Data

US 2020/0404546 A1    Dec. 24, 2020

Related U.S. Application Data

(63) Continuation of application No. PCT/JP2019/005630, filed on Feb. 15, 2019.

(30) Foreign Application Priority Data

Mar. 6, 2018   (JP) .............................. JP2018-039980

(51) Int. Cl.
 *H04W 28/18* (2009.01)
 *H04L 1/00* (2006.01)
 *H04W 84/12* (2009.01)

(52) U.S. Cl.
 CPC .......... *H04W 28/18* (2013.01); *H04L 1/0003* (2013.01); *H04W 84/12* (2013.01)

(58) Field of Classification Search
 CPC . H04W 28/18; H04W 84/12; H04W 72/1252; H04L 1/0003; H04L 1/0016
 See application file for complete search history.

(56) References Cited

U.S. PATENT DOCUMENTS 10,433,242 B2 * 10/2019 Oh ..................... H04W 48/18
2003/0050066 A1   3/2003 Tobe et al.
(Continued)

FOREIGN PATENT DOCUMENTS

JP      2003-087840 A    3/2003
JP      2006-101442 A    4/2006
(Continued)

OTHER PUBLICATIONS

International Search Report issued in corresponding International Patent Application No. PCT/JP2019/005630, dated May 14, 2019, with English Translation.

(Continued)

*Primary Examiner* — Mohammad S Anwar
(74) *Attorney, Agent, or Firm* — McDermott Will & Emery LLP

(57) ABSTRACT

A communication device for transmitting data to a plurality of radio terminals in radio communication includes: a first communication interface that performs radio communication with each of radio terminals in accordance with a first communication standard; and a controller that controls radio communication with each of the radio terminals, wherein the controller manages a modulation and coding scheme (MCS) level indicating a level of an MCS used for transmission of data for each of the radio terminals in association with a load amount indicating a communication load in the transmission of the data, wherein the controller, when detecting that the load amount is greater than a predetermined upper limit value, determines an allowable level of the MCS level corresponding to a load amount less than the upper limit value, and restricts the transmission of the data to use an MCS level equal to or higher than the allowable level.

9 Claims, 12 Drawing Sheets

(56) References Cited

U.S. PATENT DOCUMENTS

| | | |
|---|---|---|
| 2006/0211440 A1 | 9/2006 | Nomiya et al. |
| 2007/0110000 A1* | 5/2007 | Abedi .................... H04L 47/39 370/332 |
| 2011/0129028 A1* | 6/2011 | Lee .................. H04L 25/03171 375/262 |
| 2012/0176998 A1* | 7/2012 | Muellner ............ H04W 52/146 370/329 |
| 2012/0258764 A1 | 10/2012 | Asaoka et al. |
| 2015/0282008 A1* | 10/2015 | Cao ...................... H04L 1/0009 370/310 |

FOREIGN PATENT DOCUMENTS

| | | |
|---|---|---|
| JP | 2014-179690 A | 9/2014 |
| WO | 2005/025261 A1 | 3/2005 |
| WO | 2011/078329 A1 | 6/2011 |

OTHER PUBLICATIONS

International Preliminary Report on Patentability issued in corresponding International Application No. PCT/JP2019/005630, dated Sep. 17, 2020, with English translation.

* cited by examiner

Fig. 7

| TERMINAL NAME | MCS LEVEL | OCCUPANCY PERIOD IN MEASUREMENT PERIOD [S] |
|---|---|---|
| STA1 | MCS5 | 18 |
| STA2 | MCS3 | 18 |
| STA3 | MCS1 | 18 |
| STA4 | MCS5 | 33 |
| STA5 | MCS7 | 8 |

Fig. 8

| MCS LEVEL | OCCUPANCY PERIOD IN MEASUREMENT PERIOD [S] |
|---|---|
| MCS1 | 18 |
| MCS2 | 0 |
| MCS3 | 18 |
| MCS4 | 0 |
| MCS5 | 51 |
| MCS6 | 0 |
| MCS7 | 8 |
| MCS8 | 0 |
| MCS9 | 0 |

Fig. 10

| TERMINAL NAME | MCS LEVEL | OCCUPANCY PERIOD IN MEASUREMENT PERIOD [S] |
|---|---|---|
| STA4 | MCS5 | 33 |
| STA5 | MCS7 | 8 |

Fig. 11

| MCS LEVEL | OCCUPANCY PERIOD IN MEASUREMENT PERIOD [S] |
|---|---|
| MCS1 | 0 |
| MCS2 | 0 |
| MCS3 | 0 |
| MCS4 | 0 |
| MCS5 | 33 |
| MCS6 | 0 |
| MCS7 | 8 |
| MCS8 | 0 |
| MCS9 | 0 |

COMMUNICATION DEVICE AND RADIO COMMUNICATION SYSTEM

CROSS-REFERENCE OF RELATED APPLICATIONS

This application is the Continuation Application of International Patent Application No. PCT/JP2019/005630, filed on Feb. 15, 2019, which in turn claims the benefit of Japanese Application No. 2018-039980, filed on Mar. 6, 2018, the entire disclosures of which Applications are incorporated by reference herein.

BACKGROUND

1. Technical Field

The present disclosure relates to a communication device and a radio communication system for performing radio communication with a plurality of radio terminals.

2. Related Art

JP 2006-101442 A discloses a radio base station apparatus that changes the size of a cell when receiving a cell size change command from a base station controller. The base station controller measures the traffic amount in each cell corresponding to a plurality of radio base stations. The base station controller transmits a cell size change command so as to change the cell size to a one-step narrower size depending on whether or not the measured traffic amount exceeds a first threshold value, or to return the cell size from the one-step narrower size to the original cell size depending on whether or not the traffic amount is below a second threshold value.

SUMMARY

An object of the present disclosure is to provide a communication device and a radio communication system that are able to facilitate a reduction in communication load in radio communication with a plurality of radio terminals.

A communication device of the present disclosure transmits data to a plurality of radio terminals in radio communication. The communication device includes a first communication interface and a controller. The first communication interface performs radio communication with each of radio terminals in accordance with a first communication standard. The controller that controls radio communication with each of the radio terminals. The controller manages a modulation and coding scheme (MCS) level indicating a level of an MCS used for transmission of data for each of the radio terminals in association with a load amount indicating a communication load in the transmission of the data. When detecting that the load amount is greater than the upper limit value, the controller determines an allowable level of the MCS level corresponding to a load amount less than a predetermined upper limit value. The controller restricts the transmission of the data to use an MCS level equal to or higher than the allowable level.

A radio communication system of the present disclosure includes the communication device and a radio terminal. The radio terminal receives data from the communication device.

According to the present disclosure, the communication device and the radio communication system are able to facilitate a reduction in communication load in radio communication with a plurality of radio terminals.

BRIEF DESCRIPTION OF THE DRAWINGS

FIG. 7 is a diagram showing an example of a special temporary authority (STA) table in the traffic optimization processing;

FIG. 8 shows an MCS table obtained by converting the STA table of FIG. 7;

FIG. 10 is a diagram showing another example of the STA table in the traffic optimization processing;

FIG. 11 is a diagram showing an MCS table obtained by converting the STA table of FIG. 10.

DETAILED DESCRIPTION

Hereinafter, embodiments will be described in detail with reference to the drawings. However, a more detailed description than necessary may be omitted. For example, a detailed description of already well-known matters or a duplicate description of substantially the same structure may be omitted. This is to avoid unnecessary redundancy in the following description and to facilitate understanding by those skilled in the art.

Note that the inventor(s) provide(s) the accompanying drawings and the following description in order for a person skilled in the art to fully understand the present disclosure and are not intended to limit the subject matter described in the claims.

First Embodiment

1. Configuration 1-1. System Overview

Figure 1:
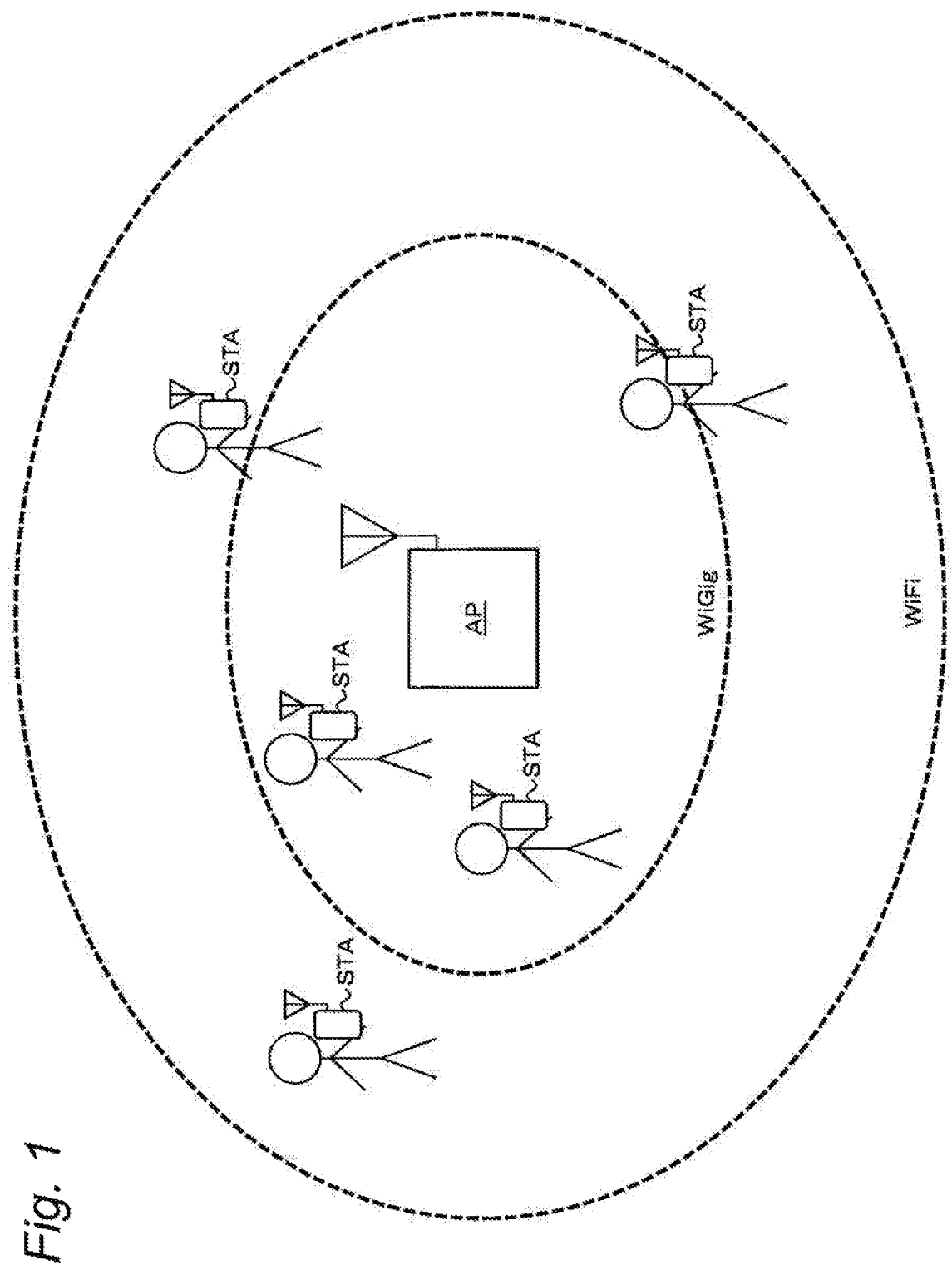
FIG. 1 is a diagram for explaining an outline of a radio communication system according to a first embodiment.

A radio communication system according to a first embodiment will be described with reference to FIG. 1 FIG. 1 is a diagram for explaining the outline of the radio communication system according to the present embodiment.

The radio communication system according to the present embodiment includes a communication device AP that functions as an access point in radio communication, and a plurality of radio terminals STA that function as stations. FIG. 1 shows a state in which a plurality of users carrying the respective radio terminals STA pass around the communication device AP in the present system. The communication device AP is installed in advance in a commercial facility, for example. The radio terminal STA is, for example, a mobile device.

The present system is applicable to an application in which a plurality of users download desired content data from a communication device AP by using their respective radio terminals STA. For example, various pieces of content data, such as moving images, are stored in advance in the communication device AP.

In the present embodiment, the radio communication system adopts two types of radio communication based on the WiGig (registered trademark) standard and the WiFi (registered trademark) standard to construct a communication environment in which a plurality of users can easily download content data simultaneously. The WiGig standard is an example of the first communication standard in the radio communication system of the present embodiment, and the WiFi standard is an example of the second communication standard.

For example, with the radio communication of the WiGig standard, the information terminal STA can perform the download from the communication device AP at a higher speed than the radio communication of the WiFi standard. In such a case, the communication load or traffic of the communication device AP varies each moment depending on the number of radio terminals STA in communication, the distance to each radio terminal STA, the data amount of content data to be downloaded, and the like. In the present system, traffic is optimized by performing dynamic control to limit an area (hereinafter referred to as "communication allowable area") in which the download by the radio communication of the WiGig standard is allowed.

1-2. Hardware Configuration

Figure 2:
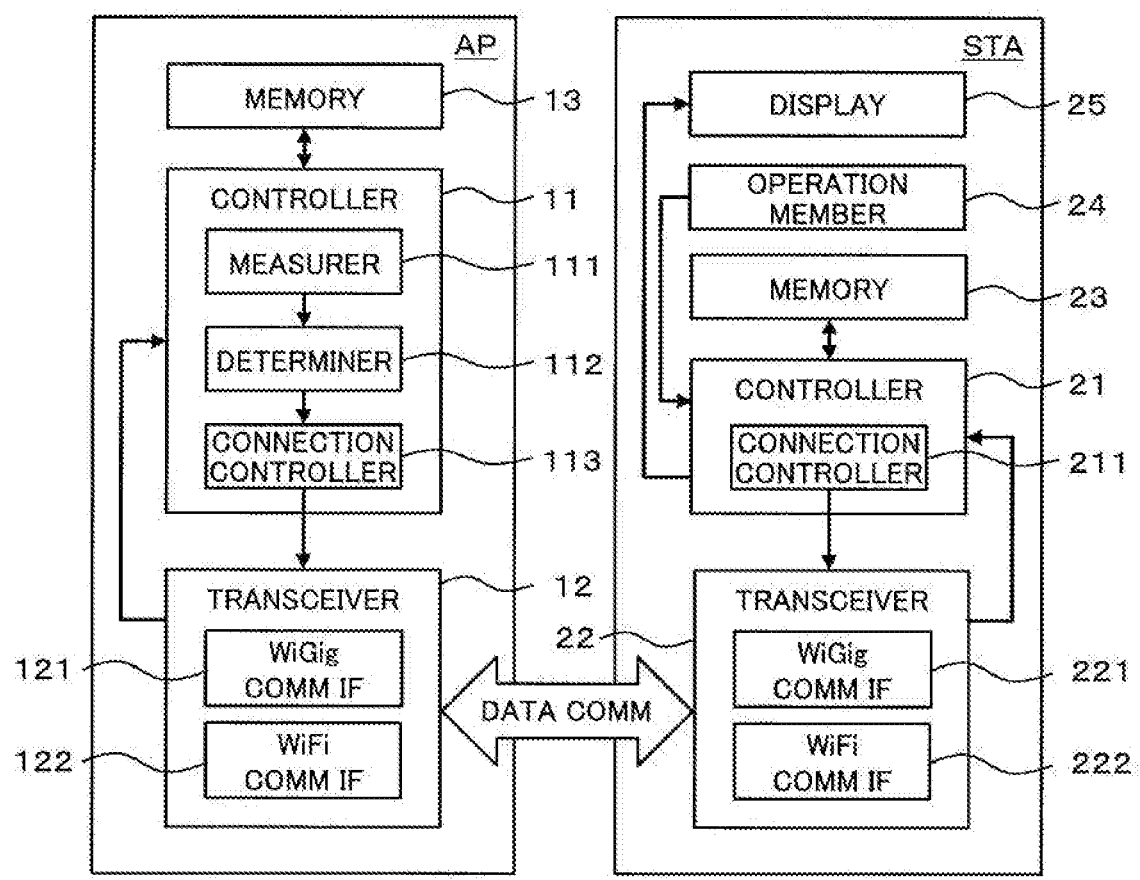
FIG. 2 is a block diagram showing a configuration of a communication device and a radio terminal in the radio communication system.

The configuration of the radio communication system according to the first embodiment will be described with reference to FIG. 2. FIG. 2 is a block diagram showing the configuration of the communication device AP and the radio terminal STA in the radio communication system.

The communication device AP according to the present embodiment is, for example, a personal computer (PC) or various base station apparatuses. As shown in FIG. 2, the communication device AP includes a controller 11, a transceiver 12, and a memory 13. The transceiver 12 includes a WiGig communication interface 121 and a WiFi communication interface 122.

The controller 11 includes, for example, a central processing unit (CPU) or a microprocessor unit (MPU) that implements a predetermined function in cooperation with software, and the controller 11 controls the entire operation of the communication device AP. The controller 11 implements various functions by reading predetermined programs and data stored in the memory 13 and performing arithmetic processing. For example, the controller 11 includes a measurer 111, a determiner 112, and a connection controller 113 as functional configurations.

The measurer 111 measures a load amount indicating a communication load in the WiGig communication interface 121. The determiner 112 determines whether or not to change the communication allowable area based on the measurement result of the measurer 111. The measurer 111 and the determiner 112 are implemented by, for example, an application program.

The connection controller 113 controls an operation, such as communication connection, performed by the transceiver 12 based on the determination result by the determiner 112. The connection controller 113 is implemented by a communication program such as a driver.

The controller 11 may be a hardware circuit such as a dedicated electronic circuit or a reconfigurable electronic circuit designed to implement the predetermined function as described above. The controller 11 may be made up of various semiconductor integrated circuits such as a CPU, an MPU, a graphics processing unit (GPU), a microcomputer, a digital signal processing (DSP), a field-programmable gate array (FPGA), and an application-specific integrated circuit (ASIC).

Under the control of the connection controller 113, the transceiver 12 transmits various pieces of information from the communication device AP to the outside and receives various pieces of information from the outside. Each of the communication interfaces 121, 122 of the transceiver 12 is made up of, for example, an oscillator, a modulation circuit, a demodulation circuit, an antenna, and the like.

In the transceiver 12, the WiGig communication interface 121 is an example of a first communication interface that performs radio communication conforming to the IEEE 802.11ad/WiGig standard. The WiFi communication interface 122 is an example of a second communication interface that performs radio communication conforming to the IEEE 802.11ac/WiFi standard. The WiGig communication interface 121 and the WiFi communication interface 122 may be configured as separate modules or may be integrally configured as one module.

The memory 13 is made of flash memory and/or a hard disk. The memory 13 stores programs and data necessary for achieving various functions of the communication device AP. For example, the memory 13 stores content data as data to be transmitted to the radio terminal STA. The above programs may be provided from various communication networks or may be stored in a portable recording medium.

The radio terminal STA according to the present embodiment is, for example, a smartphone, a tablet PC, or a notebook PC. As shown in FIG. 2, the radio terminal STA includes a controller 21, a transceiver 22, a memory 23, an operation member 24, and a display 25.

The controller 21 includes, for example, a CPU or an MPU that implements a predetermined function in the cooperation with software, and the controller 21 controls the entire operation of the radio terminal STA. The controller 21 implements various functions by reading programs and data stored in the memory 23 and performing, arithmetic processing. For example, the controller 21 includes a connection controller 211 as a functional configuration.

The connection controller 211 controls an operation, such as communication connection, performed by the transceiver 22. The connection controller 211 is implemented by a communication program, for example.

The controller 21 may be a hardware circuit such as a dedicated electronic circuit or a reconfigurable electronic circuit designed to implement the predetermined function as described above. The controller 21 may be made up of various semiconductor integrated circuits such as a CPU, an MPU, a GPU, a microcomputer, a DSP, an FPGA, and an ASIC.

Under the control of the connection controller 211, the transceiver 22 transmits various pieces of information from the radio terminal STA to the outside and receives various pieces of information from the outside. The transceiver 22 includes a WiGig communication interface 221 and a WiFi communication interface 222. Each of the communication interfaces 221, 222 of the transceiver 22 is made up of, for example, an oscillator, a modulation circuit, a demodulation circuit, an antenna, and the like.

In the transceiver 22, the WiGig communication interface 221 performs radio communication conforming to the IEEE 802.11ad/WiGig standard. The WiFi communication interface 222 performs radio communication conforming to the IEEE 802.11ac/WiFi standard. The WiGig communication interface 221 and the WiFi communication interface 222 may be configured separately or may be configured integrally.

The memory 23 is made of flash memory and/or a hard disk. The memory 23 stores programs and data necessary for achieving various functions of the radio terminal STA. For example, the memory 23 stores content data downloaded from the communication device AP.

The operation member 24 is a user interface for inputting an operation performed by a user. The operation member 24 outputs a signal indicating the input user operation to the controller 21. The operation member 24 constitutes a touch panel together with the display 25, for example. The operation member 24 is not limited to a touch panel but may be a keyboard, buttons, switches, and combinations thereof.

The display 25 is made of, for example, a liquid crystal display or an organic electro luminescence (EL) display. The display 25 displays various kinds of information, such as a moving image, a still image, and character information, to a user.

2. Operation

The operation of the radio communication system according to the present embodiment will be described below.

In the present system, each radio terminal STA connectable to a communication device AP inputs, for example, an operation of a user for designating content data from an operation member 24 and requests the designated content data to the communication device AP. The communication device AP of the present embodiment transmits requested content data from the WiGig communication interface 121 or the WiFi communication interface 122 to each radio terminal STA concurrently.

The communication device AP performs traffic optimization processing for data transmission from the WiGig communication interface 121. According to the optimization processing, a load amount indicating a real-time communication load is managed in association with an MCS level indicating a level of a modulation and coding scheme (MCS) used for data transmission, to dynamically control an available MCS level. The communication method of the WiGig communication interface 121 and the traffic optimization processing will be described later.

Among the radio terminals STA, a radio terminal STA to which the content data is transmitted from the WiGig communication interface 121 of the communication device AP can perform the download at a higher speed than that when the content data is transmitted from the WiFi communication interface 122. In the present embodiment, a radio terminal STA, to which the content data is not allowed to be transmitted from the WiGig communication interface 121, can receive the same data from the WiFi communication interface 222 of the transceiver 22. As described above, the traffic in the radio communication system of the present embodiment can be optimized. The operation of the present system will be described in detail below.

2-1-1. WiGig Communication Method

The communication method using the WiGig communication interfaces 121, 221 between the communication device AP and the radio terminal STA in the present system will be described with reference to FIGS. 3 and 4.

Figure 3:
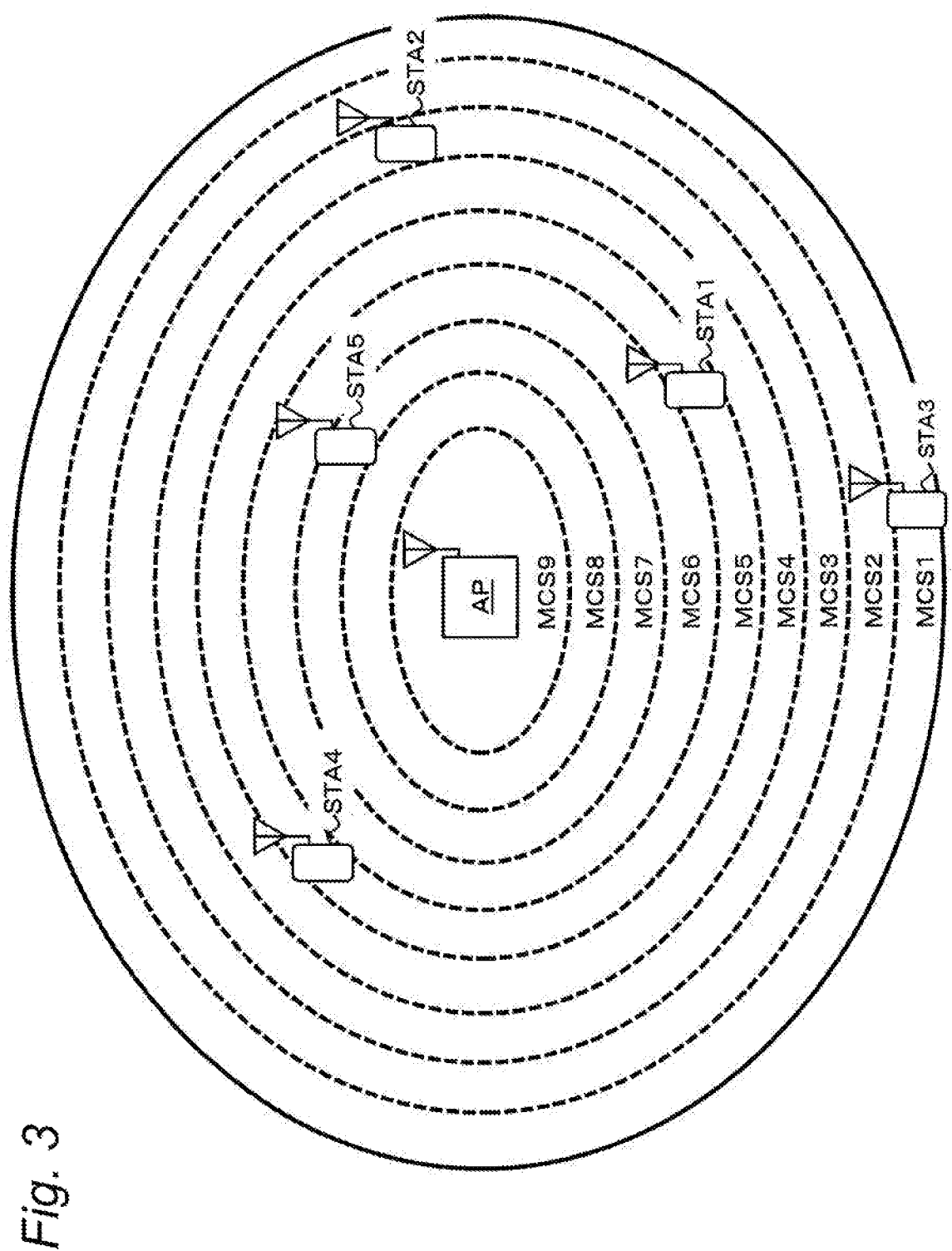
FIG. 3 is a diagram showing an arrangement example of a plurality of radio terminals in the radio communication system.

FIG. 3 is a diagram showing an arrangement example of the radio terminals STA1 to STA5 in the present system.

FIG. 3 illustrates an area in which the communication device AP can make a communication connection from the WiGig communication interface 121 (hereinafter referred to as "communicable area") as an area surrounded by a solid line. Also, a communication allowable area by each of MCS2 to MCS9 is illustrated as an area surrounded by a broken line.

The arrangement example shown in FIG. 3 is that five radio terminals STA1 to STA5 are located in the communicable areas of the communication device AP. In the present system, the MCS level used for data transmission in which content data is downloaded via the WiGig communication interface 121 of the communication device AP is set for each of the radio terminals STA1 to STA5. In the present embodiment, an example in which the nine MCS levels of MCS1 to MCS9 are used for the data transmission is described.

As indicated by the broken lines in FIG. 3, the communication allowable area by each of MCS1 to MCS9 is larger as the MCS level is lower. In the present embodiment, the communication allowable area by MCS1 matches the connectable area of the WiGig communication interface 121. On the other hand, the higher the MCS level is, the larger the amount of data can be transmitted during the same period.

In the example of FIG. 3, the radio terminal STA1 is inside the communication allowable area by the MCS5 and outside the communication allowable area by the MCS6. At this time, "MCS5" is set as the MCS level of the radio terminal STA1. Similarly to the radio terminal STA1, the MCS levels of the radio terminals STA2, STA3, STA4, and STA5 are set to "MCS3", "MCS1", "MCS5", and "MCS7", respectively.

Figure 4:
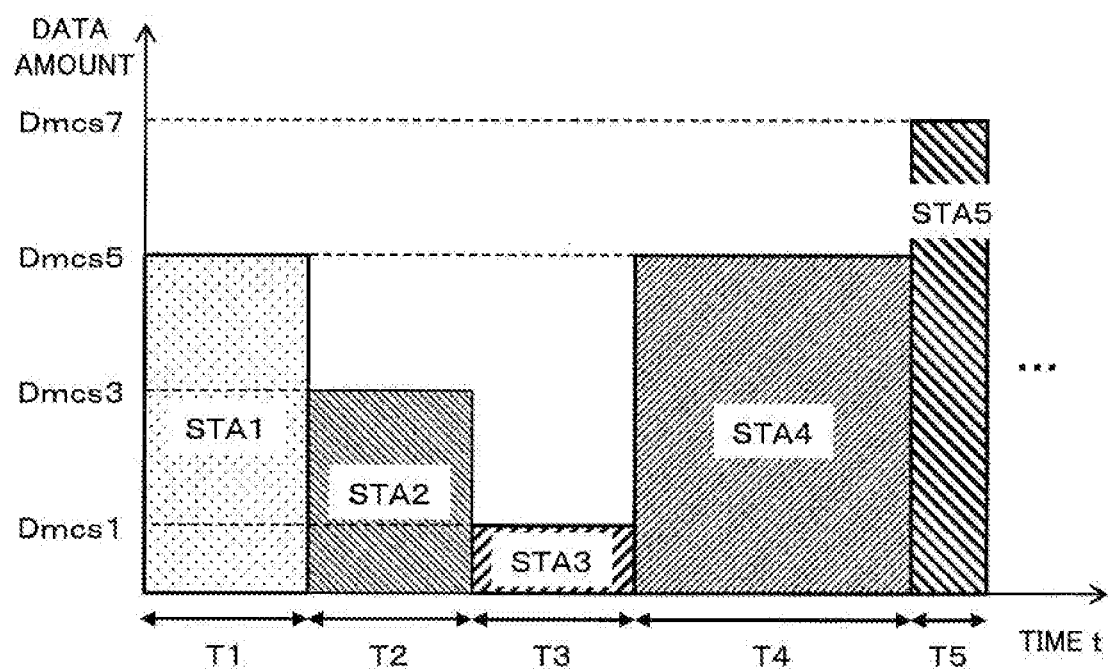
FIG. 4 is a timing chart illustrating a method for communication of the communication device with the radio terminal of FIG. 3.

FIG. 4 is a timing chart illustrating a communication method of the communication device AP for the radio terminals STA1 to STA5 of FIG. 3. FIG. 4 shows the timing at which the communication device AP transmits content data from the WiGig communication interface 121 to each of the radio terminals STA1 to STA5 in a time-division manner. When transmitting the requested content data from the WiGig communication interface 121 to each of the radio terminals STA1 to STA5, the communication device AP divides the content data into pieces of divided data.

In period T1, the communication device AP transmits divided data having a data amount Dmcs5 corresponding to a set MCS level "MCS5" to the radio terminal STA1. In the next period T2, the WiGig communication interface 121 transmits divided data having a data amount Dmcs3 (<Dmcs5) of "MCS3" to the radio terminal. STA2 in the same manner as the radio terminal STA1.

In subsequent periods T3, T4, and T5, the WiGig communication interface 121 sequentially transmits the pieces of divided data of the data amounts Dmcs1, Dmcs5, Dmcs7 of "MCS1", "MCS5", and "MCS7" to the radio terminals STA3, STA4, and STA5, respectively, in the same manner as described above. The WiGig communication interface 121 repeats the transmission of the divided data to each of the radio terminals STA1 to STA5 at a predetermined cycle. The cycle is larger than, for example, the periods T1 to T5.

By the above operation, the plurality of radio terminals STA1 to STA5 occupy the WiGig communication interface 121 of the communication device AP for the respective time-division periods T1 to T5, so that the downloads of the respective content data can be proceeded concurrently. The length of the periods T1 to T5 for each of the radio terminals STA1 to STA5 is appropriately allocated in accordance with, for example, the data amount of the content data, the set MCS level, and the like.

Here, the total period required for transmitting content data of the same data amount is longer as the MCS level is lower. Thus, in the radio communication system, it is conceivable that the entire traffic of the radio communication system deteriorates due to a long period during which a radio terminal of a low MCS level, such as "MCS1", occupies the WiGig communication interface 121.

To solve this, the communication device AP of the present embodiment sets an MCS level (hereinafter referred to as "allowable level") at which the download of content data from the WiGig communication interface 121 is allowed. With the allowable level, the communication allowable area for the download from the WiGig communication interface 121 can be reduced or expanded, whereby it is possible to easily optimize the traffic of the radio communication system.

2-1. Connecting Operation

A connecting operation for establishing the communication connection by the WiGig communication interfaces 121, 221 between the communication device AP and the radio terminal STA will be described with reference to FIG. 5.

Figure 5:
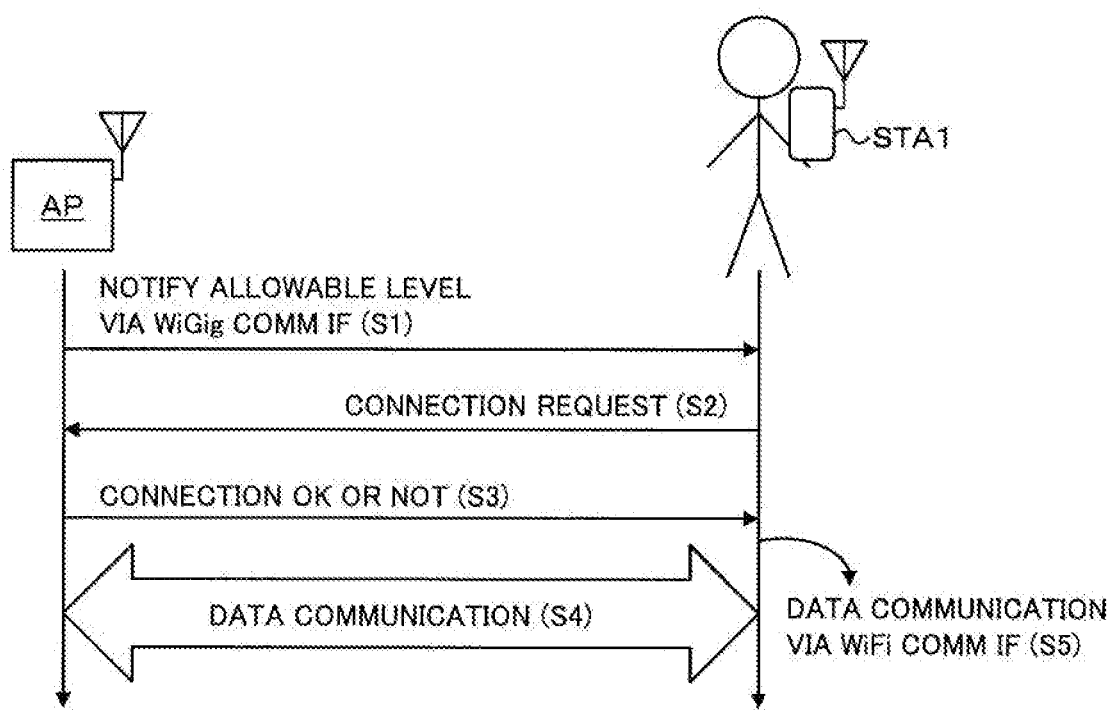
FIG. 5 is a sequence diagram for explaining a connecting operation in the radio communication system.

FIG. 5 is a sequence diagram for explaining the connecting operation in the present system. FIG. 5 illustrates a connecting operation for the communication device AP to perform radio communication with one radio terminal STA1.

At first, the communication device AP uses the MCS level of "MCS1" from the WiGig communication interface 121 to broadcast a notification indicating the current allowable level, such as "MCS4" (S1). Thus, each radio terminal STA in the communicable area can receive information indicating the allowable level. For example, the communication device AP repeats the notification of step S1 at a predetermined cycle.

The radio terminal STA1 in the arrangement example of FIG. 3 transmits a connection request for a communication connection by the WiGig communication interface 221 to the communication device AP (S2), according to the set MCS level "MCS5" being equal to or higher than the notified allowable level "MCS4". The connection request in step S2 includes, for example, an MCS level desired by the radio terminal STA1 (such as "MCS5"), a designation of content data, and the like.

When receiving a connection request from the radio terminal STA1, the communication device AP determines whether or not to permit the radio terminal STA1 to connect, and transmits information indicating the determination result to the radio terminal STA1 (S3). The determination in step S3 is performed by the controller 11 of the communication device AP in view of the communication load of the WiGig communication interface 121 in the case that the connection request is permitted.

When the communication device AP permits the connection of the radio terminal STA1 (OK in S3), the communication device AP starts data communication with the radio terminal STA1 by the WiGig communication interface 121 (S4). In step S4, the communication device AP transmits the content data to the radio terminal STA1 using an MCS level (such as "MCS5") equal to or higher than the allowable level.

On the other hand, when the communication device AP determines that the connection of the radio terminal STA is not permitted, the radio terminal STA1 performs data communication with the communication device AP in the WiFi communication interface 222 and receives the content data (S5).

When the permission level notified in step S1 is equal to or higher than the MCS level set in the radio terminal STA1, the radio terminal STA performs data communication with the communication device AP in the WiFi communication interface 222 without making the connection request in step S2 (S5). As described above, the WiFi communication interface 122 of the communication device AP transmits the content data to the radio terminal STA1 having not received the content data from the WiGig communication interface 121.

The communication device AP performs the above connecting operation simultaneously with the radio terminals STA1 to STA5. When the communication device AP permits the connection of the plurality of radio terminals STA1 to STA5 (OK in S3), the communication device AP transmits the divided data of each of the content data to the radio terminals STA1 to STA5 in a time-division manner, as shown in FIG. 4.

2-2. Traffic Optimization Processing

The traffic optimization processing that the communication device AP of the present, system reduces the communication load of the WiGig communication interface 121 for the connecting operation with each of the radio terminals STA1 to STA5 as described above will be described with reference to FIGS. 6 to 12.

Figure 6:
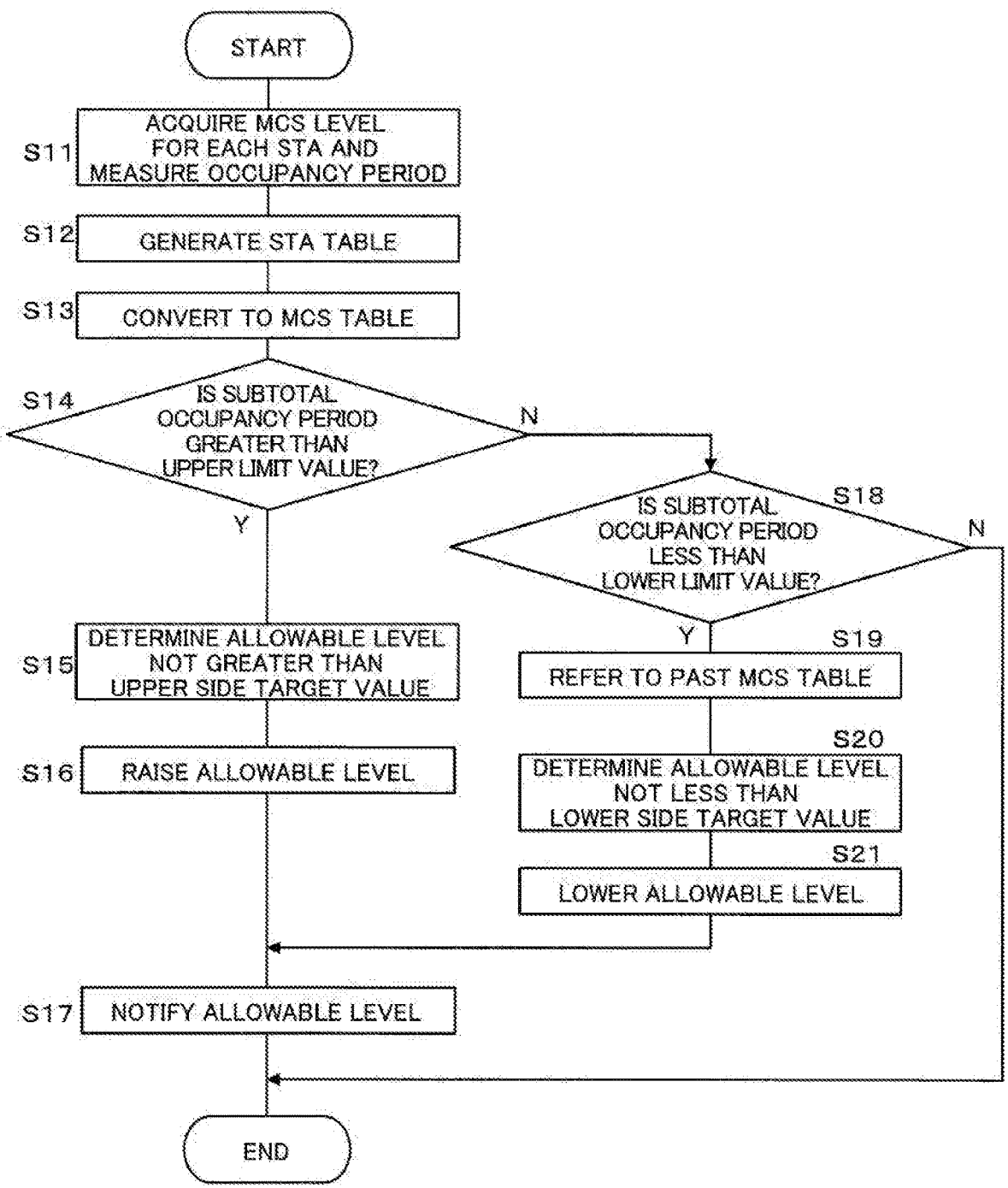
FIG. 6 is a flowchart showing traffic optimization processing by the communication device.

FIG. 6 is a flowchart showing the traffic optimization processing by the communication device AP. The flowchart of FIG. 6 is performed periodically, for example, during data communication with the radio terminals STA1 to STA5 (S4 in FIG. 5) in the WiGig communication interface 121 of the communication device AP.

Each processing in the flowchart of FIG. 6 is performed by the controller 11 of the communication device AP functioning as the measurer 111, the determiner 112, and the connection controller 113. In the following, an example is described in which the processing according to the flowchart starts with the allowable level of "MCS1".

At first, the measurer 111 in the controller 11 of the communication device AP acquires the MCS level of each of the radio terminals STA1 to STA5 during communication, and measures an occupancy period for data communication by each of the radio terminals STA1 to STA5 in a predetermined measurement period (S11). The measurement period is, for example, 100 seconds. Fox example, the measurer 111 accumulates the periods T1 to T5 for each of the radio terminals STA1 to STA5 respectively in the measurement period during the communication of FIG. 4. Various occupancy periods are examples of the load amount of the present embodiment.

Next, the measurer 111 generates an STA table based on the acquired MCS level of each radio terminal STA and the occupancy period in the measurement period (S12). The STA table is a table for managing measurement results for each information terminal STA. FIG. 7 shows an example of the STA table.

The example of FIG. 7 is an example in which the measurement results obtained by accumulating the periods T1, T2, T3, T4, and T5 (FIG. 4) for the respective radio terminals STA1 to STA5 in step S11 are 18 seconds, 18 seconds, 18 seconds, 33 seconds, and 8 seconds, respectively. As illustrated in FIG. 7, the STA table associates, for each of the radio terminals STA1 to STA5, a terminal name, an MCS level, and an occupancy period in a measurement period with each other. For example, for the radio terminal STA1, the MCS level "MCS5" is associated with an occupancy period "18 seconds" in the measurement period. For the radio terminal STA4, "MCS5" is associated with an occupancy period "33 seconds" in the measurement, period.

Next, the measurer 111 converts the generated STA table into an MCS table (S13). The MCS table is a table for managing the measurement result of the communication load for each MCS level. FIG. 8 shows an example of the MCS table.

FIG. 8 shows a conversion result of the STA table illustrated in FIG. 7. As illustrated in FIG. 8, the MCS table associates each of the MCS levels MCS1 to MCS9 with an occupancy period in a measurement period. The measurer 111 sums the occupancy periods of the radio terminals STA1 to STA5 in the STA table for each MCS level, and records the summed period in the MCS table. For example, with respect to the two radio terminals STA1 and STA4 associated with "MCS5" in the example of FIG. 7, the MCS table of the example of FIG. 8 associates the MCS level "MCS5" with an occupancy period "51 seconds" which is the sum of the two radio terminals STA1 and STA4.

Then, based on the MCS table, for example, the determiner 112 detects whether or not the subtotal occupancy period indicating the subtotal of the occupancy periods (for the current allowable level or higher) is greater than a predetermined upper limit value (S14). The determiner 112 calculates a subtotal occupancy period by summing the occupancy periods for the respective MCS levels in the MCS table selectively. The upper limit value is a threshold value indicating a criterion for raising the allowable level and is set to 90 seconds with respect to a measurement period of 100 seconds, for example.

For example, when the current allowable level is "MCS1" in the example of FIG. 8, the determiner 112 calculates 95 seconds as the subtotal occupancy period by summing all of the occupancy periods in the MCS table. In this case, as a result of comparing the calculated subtotal occupancy period "95 seconds" with the upper limit value "90 seconds", the determiner 112 detects that the subtotal occupancy period is greater than the upper limit value (YES in step S14).

When detecting that the subtotal occupancy period is greater than the upper limit value (YES in step S14), the determiner 112 determines an allowable level at which the subtotal occupancy period is not greater than a predetermined target value (S15). The target value in step S15 is a threshold value indicating a target for raising the allowable level and is set to, for example, 75 seconds with respect to the upper limit value "90 seconds". The processing of step S15 is described with reference to FIG. 9.

Figure 9:
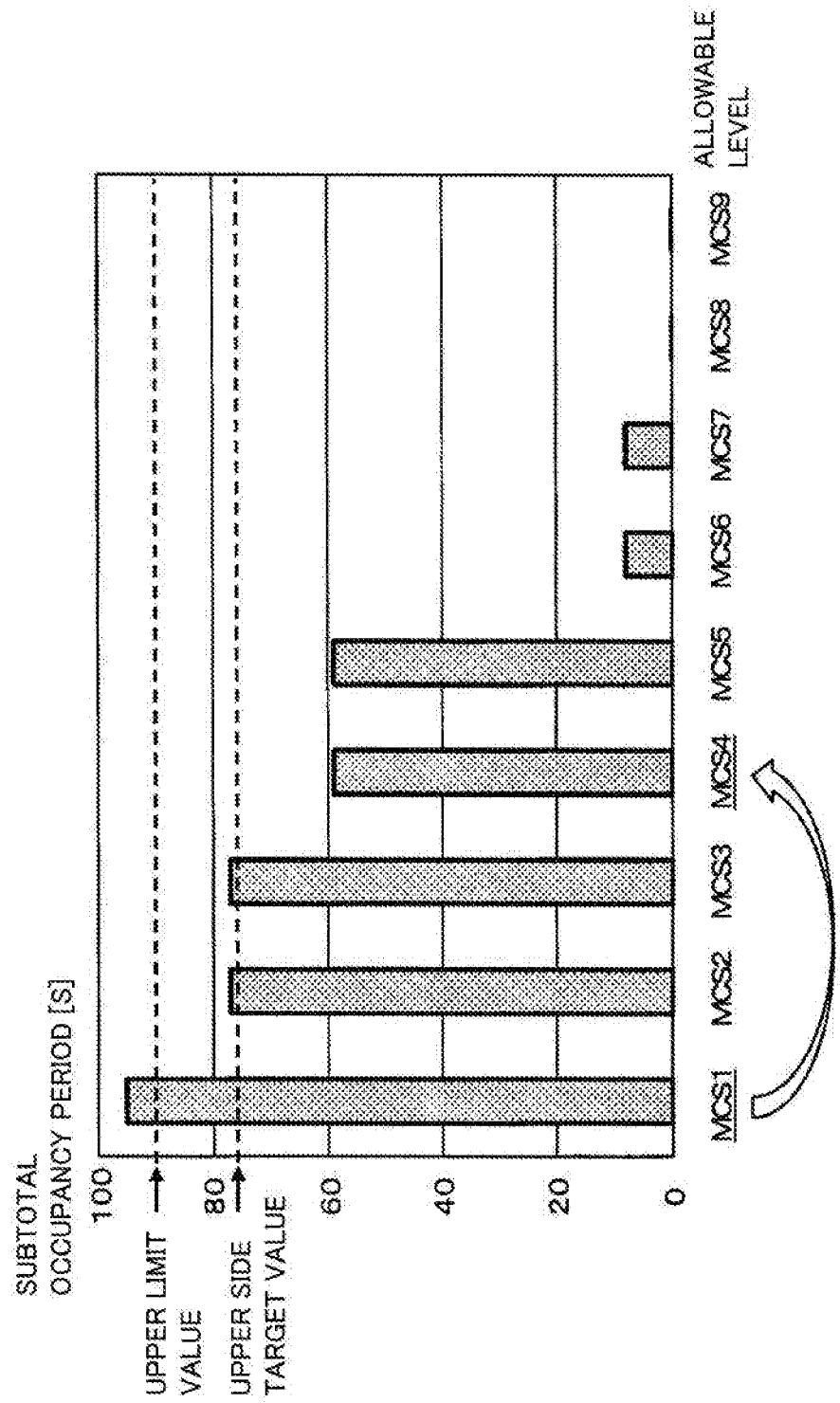
FIG. 9 is a diagram for explaining the processing of step S15 in FIG. 6.

FIG. 9 shows respective subtotal occupancy periods in the MCS table of FIG. 8 when the allowable level is set to each of MCS1 to MCS9. As shown in FIG. 9, the subtotal occupancy period with the allowable level "MCS1" is greater than the upper limit value "90 seconds". The subtotal occupancy period with the allowable level "MCS2" or "MCS3" is below the upper limit value while greater than the (upper side) target value "75 seconds". The subtotal occupancy period with the allowable level "MCS4" is 59 seconds, which is below the target value. In step S15, the determiner 112 calculates a subtotal occupancy period when the allowable level is changed, for example, and specifies a minimum allowable level "MCS4" in the allowable levels MCS4 to MCS9 where the subtotal occupancy period is equal to or less than the target value.

Next, the controller 11 as the connection controller 113 raises the allowable level of the WiGig communication interface 121 to the determined allowable level based on the determination result of the determiner 112 (S16). In the example of FIG. 9, the controller 11 changes the allowable level from "MCS1" to "MCS4" and restricts the MCS level used for downloading content data from the WiGig communication interface 121 to equal to or higher than "MCS4". As a result, the communication allowable area of the WiGig communication interface 121 is reduced.

Next, the controller 11 controls the transceiver 12 as the connection controller 113 and transmits (broadcasts) a notification indicating the changed allowable level to each radio terminal STA (S17). For example, the WiGig communication interface 121 of the transceiver 12 uses the MCS level of "MCS1" to notify each radio terminal STA that the allowable level in the example of FIG. 9 is MCS 4.

After the notification of the allowable level (S17), the controller 11 stores, for example, the MCS table in the memory 13 and ends the processing Thereafter, the controller 11 repeats the processes after step S11.

On the other hand, when detecting that the subtotal occupancy period is not greater than the upper limit value (NO in step S14), the controller 11 detects, as the determiner 112, whether or not the subtotal occupancy period is less than a predetermined lower limit value (S18). The lower limit value is a threshold value indicating a criterion for lowering the allowable level and is set to, for example, 50 seconds. The processing of step S18 is described with reference to FIGS. 10 and 11.

FIG. 10 illustrates an STA table (S12) after the determination in FIG. 9 in a state where the download of the content data of the radio terminal STA1 is completed. FIG. 11 shows an MCS table (S13) obtained by converting the STA table of FIG. 10. Since the subtotal occupancy period in the example of FIG. 11 is 41 seconds, the determiner 112 detects that the subtotal occupancy period is less than the lower limit value "50 seconds" (YES in step S18).

When the determiner 112 detects that the subtotal occupancy period is less than the lower limit value (YES in step S18), the controller 11 refers to the past MCS table (S19). The communication device AP stores, for example, a plurality of past MCS tables in the memory 13. The reference to the past MCS table is made for predicting an increment of the subtotal occupancy period when the allowable level is lowered.

For example, in step S19, the controller 11 refers to the MCS table before raising the allowable level among the MCS tables in the past. Referring to the past MCS table of FIG. 8, the controller 11 identifies "18 seconds" as an increment of the subtotal occupancy period when the allowable level is lowered from "MCS4" to "MCS3". Further, the controller 11 identifies "18 seconds" as an increment of the subtotal occupancy period when the allowable level is lowered from "MCS3" to "MCS1". In step S13, the controller 11 supplements the MCS table of FIG. 11 based on the above identifying result, for example.

Next, the controller 11 determines, as the determiner 112, an allowable level at which the subtotal occupancy period is not less than a target value on the lower side (S20). The target value in step S20 is a threshold value indicating a target for reducing the allowable level. The processing of step S20 is described with reference to FIG. 12.

Figure 12:
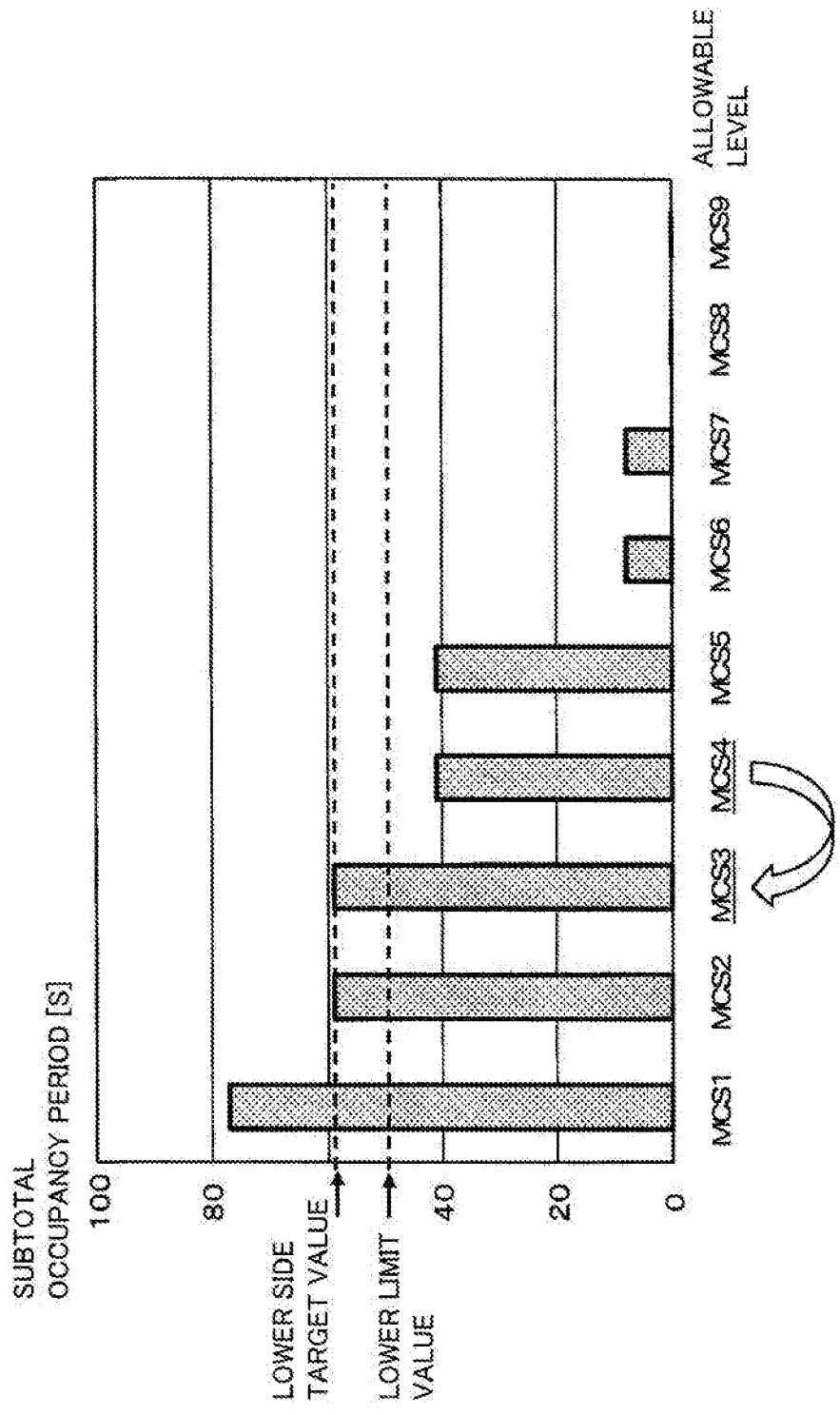
FIG. 12 is a diagram for explaining the processing of step S20 in FIG. 6.

FIG. 12 shows subtotal occupancy periods at various allowable levels in a case where the MCS table of FIG. 11 is supplemented with the MCS table of FIG. 8. In the example of FIG. 12, the determiner 112 sets, as the lower side target value, the subtotal occupancy period in the past immediately before the current allowable level "MCS4" reaches the lower limit value or less. That is, in FIG. 9, the subtotal occupancy period is 59 seconds when the allowable level is "MCS4", so that the determiner 112 sets the lower side target value to 59 seconds. When the allowable level is lowered to the MCS3, the determiner 112 specifies "MCS3"

as an allowable level at which the subtotal occupancy period is extended for 18 seconds and the subtotal occupancy period is equal to or less than the lower side target value (S20).

Next, the controller 11, as the connection controller 113, lowers the allowable level of the WiGig communication interface 121 to the determined allowable level (S21). Thus, the communication allowable area of the WiGig communication interface 121 is expanded. Thereafter, the controller 11 proceeds to step S17.

When the determiner 112 detects that the subtotal occupancy period is not below the lower limit value (NO in step S18), the controller 11 ends the present processing without performing the processing of steps S19, S20, S21, and S17.

According to the above processing, by dynamically controlling the allowable level of the MCS, it is possible to optimize the traffic of the WiGig communication interface 121 in the communication device AP such that, for example, the subtotal occupancy period changes in the vicinity of the target value.

In the above description, the example in which the lower side target value is set based on the subtotal occupancy period in the past is exemplified. The lower side target value may be preset to a predetermined value.

3. Summary

As described above, the communication device AP according to the present embodiment transmits content data to each of the plurality of radio terminals STA1 to STA5. The communication device AP includes the WiGig communication interface 121 and the controller 11. The WiGig communication interface 121 performs radio communication with each radio terminal STA in accordance with the WiGig standard which is an example of the first communication standard. The controller 11 controls radio communication with each radio terminal STA. The controller 11 manages an MCS level indicating a level of an MCS used for transmission of content data for each radio terminal STA in association with an occupancy period which is an example of a load amount indicating a communication load in the transmission of content data (S11 to S14). When detecting that the occupancy period is greater than the upper limit value (YES in step S14), the controller 11 determines the allowable level of the MCS level corresponding to the occupancy period less than the upper limit value (S15). The controller 11 restricts the transmission of the content data to use an MCS level equal to or higher than the allowable level (S16).

With the communication device AP described above, it is possible to facilitate a reduction in communication load in the radio communication with the plurality of radio terminals STA1 to STA5 by limiting the transmission of the content data so as to use the MCS level equal to or higher than the allowable level from the WiGig communication interface 121.

In the communication device AP according to the present embodiment, the allowable level is the minimum MCS level in MCS levels each corresponding to an occupancy period equal to or less than a target value which is a predetermined value less than the upper limit value.

With the configuration described above, when detecting that the occupancy period is greater than the upper limit value, the controller 11 determines the allowable level of the MCS level corresponding to the occupancy period less than the upper limit value. The controller 11 reduces the communication load of the WiGig communication interface 121 by limiting the transmission of the content data so as to use an MCS level equal to or higher than the allowable level.

Thus, the communication device AP according to the present embodiment can be optimized in the side of reducing the communication load to the allowable level by one control.

In the communication device AP according to the present embodiment, when detecting that the occupancy period is less than the lower value, the controller 11 lowers the allowable level.

With the above configuration, the controller 11 lowers the allowable level to increase the allowable range of the communication load of the WiGig communication interface 121. Thus, the communication device AP according to the present embodiment can be optimized also in the other side of increasing the communication load.

In the communication device AP according to the present embodiment, the WiGig communication interface 121 transmits a notification indicating the allowable level to each of the plurality of radio terminals STA by using the MCS level lower than the allowable level.

With the configuration described above, the communication device AP according to the present embodiment can notify the allowable level not only to the radio terminal STA of the MCS level equal to or higher than the allowable level but also to the radio terminal STA of the MCS level lower than the allowable level.

In the communication device AP according to the present embodiment, when the allowable level is changed, the controller 11 causes the WiGig communication interface 121 to transmit a notification indicating the changed allowable level.

With the configuration described above, the communication device AP according to the present embodiment can notify each radio terminal STA that the allowable level has been changed.

The communication device AP according to the present embodiment further includes a WiFi communication interface 122 that transmits the content data to an unpermitted radio terminal STA in the radio communication performed in accordance with the WiFi standard which is an example of the second communication standard. The unpermitted radio terminal STA is a radio terminal to which the content data is not allowed to be transmitted from the WiGig communication interface 121.

With the above configuration, the communication device AP according to the present embodiment can optimize the communication load in accordance with the WiGig standard and can also transmit the content data to the radio terminal STA not performing communication in accordance with the WiGig standard.

The radio communication system according to the present embedment includes a communication device AP and a radio terminal STA. A radio terminal STA receives content data from a communication device AP.

According to the present system, the communication device AP can facilitate a reduction in communication lead in the radio communication with the radio terminal STA. In the present system, when the radio terminal STA is greater than received the content data in the radio communication performed in accordance with the first standard, the radio terminal STA may receive the data in the radio communication performed in accordance with the second communication standard different from the first communication standard.

Other Embodiments

As described above, the first embodiment has been described as an example of the technique disclosed in the present application. However, the technique in the present disclosure is not limited thereto but can be applied to embodiments in which modifications, replacements, additions, omissions, and the like are performed as appropriate. The constituents described in the first embodiment may be combined to form a new embodiment. Hereinafter, other embodiments will be illustrated.

In the first embodiment described above, the example in which the communication device AP stores content data in advance has been described. The radio communication system of the present embodiment is not limited thereto, and for example, the communication device AP may acquire content data from an external server or the like via a communication network such as the Internet. In this case, the communication device AP may further include a network communication interface, or the like, that communicates and connects with the communication network.

In each of the above embodiments, an example has been described that the radio terminal STA to which the content data is not allowed to be downloaded by the WiGig communication interface 121 uses the WiFi communication interface 222 for downloading the content data, but the present system is not limited thereto. For example, the radio terminal STA, to which the content data is not allowed to be downloaded by the WiGig communication interface 121, may wait until the download is allowed.

In each of the above embodiments, the WiGig standard and the WiFi standard have been described as examples of the first and second communication standards that are used in the radio communication system. The present embodiment is not limited thereto, and for example, the present system may perform radio communication of various millimeter wave bands, or the like, instead of the radio communication of the WiGig standard. As the second communication standard, a communication standard, such as IEEE 802.11a/11b/11g/11ac, may be adopted. In this case, in accordance with the adopted first and second communication standards, the first and second communication interfaces are configured to appropriately conform to the first and second communication standards.

In each of the above embodiments, the example in which the radio communication system uses the first and second communication standards has been described. The radio communication system of the present embodiment may not use the second communication standard. In this case as well, the communication load of the first communication interface can be reduced by determining the allowable level of the MCS in the communication device AP and limiting the radio communication according to the first communication standard. It is also possible to induce the user of the radio terminal STA, to which the content is not allowed to be downloaded, to move.

In each of the above embodiments, the occupancy period has been described as an example of the load amount managed by the communication device AP. The present embodiment is not limited thereto, and various load amounts, such as various pieces of data amounts, may be used instead of the occupancy period.

As described above, the embodiments have been described as examples of the technique in the present disclosure. For this purpose, the attached drawings and detailed descriptions are provided.

Thus, the constituents described in the accompanying drawings and detailed description may include not only constituents that are essential for the solution of the problem but also constituents that are not essential for the solution of the problem in order to illustrate the technique. Therefore, the presence of such non-essential constituents in the accompanying drawings or detailed description should not immediately lead to a finding that such non-essential constituents are essential.

In addition, since the embodiments described above are for illustrating the techniques in the present disclosure, various changes, replacements, additions, omissions, and the like can be made in the scope of claims or equivalents thereof.

The present disclosure is applicable as a radio communication system for downloading various pieces of data from a communication device to a plurality of radio terminals, for example, in terminals, exhibition events, commercial facilities, airports, hotels, and various commercial facilities.

The invention claimed is:

1. A communication device for transmitting data to a plurality of radio terminals in radio communication, the communication device comprising:
   a first communication interface that performs radio communication with each of radio terminals in accordance with a first communication standard; and
   a controller that controls radio communication with each of the radio terminals,
   wherein the controller manages a modulation and coding scheme (MCS) level indicating a level of an MCS used for transmission of data for each of the radio terminals in association with a load amount indicating a communication load in the transmission of the data,
   wherein the controller, when detecting that the load amount is greater than a predetermined upper limit value,
   determines an allowable level of the MCS level corresponding to a load amount less than the upper limit value, and
   restricts the transmission of the data to use an MCS level equal to or higher than the allowable level.

2. The communication device according to claim 1, wherein the allowable level is a minimum MCS level in MCS levels each corresponding to a load amount equal to or less than a predetermined value that is less than the upper limit value.

3. The communication device according to claim 1, wherein the controller lowers the allowable level when detecting that the load amount is less than a lower limit value that is lower than the upper limit value.

4. The communication device according to claim 1, wherein the first communication interface transmits a notification indicating the allowable level to each of the plurality of radio terminals by using an MCS level lower than the allowable level.

5. The communication device according to claim 1, wherein the controller, when changing the allowable level, causes the first communication interface to transmit a notification indicating the changed allowable level.

6. The communication device according to claim 1, wherein the first communication standard is a WiGig standard.

7. The communication device according to claim 1, further comprising:
   a second communication interface that transmits the data to an unpermitted radio terminal in the radio communication in accordance with a second communication standard different from the first communication standard, the unpermitted radio terminal being a radio terminal to which the data is not allowed to be transmitted from the first communication interface.

8. The communication device according to claim 7, wherein the second communication standard is a WiFi standard.

9. A radio communication system comprising:
the communication device according to claim 1; and
a radio terminal that receives the data from the communication device.

* * * * *